UNITED STATES PATENT OFFICE.

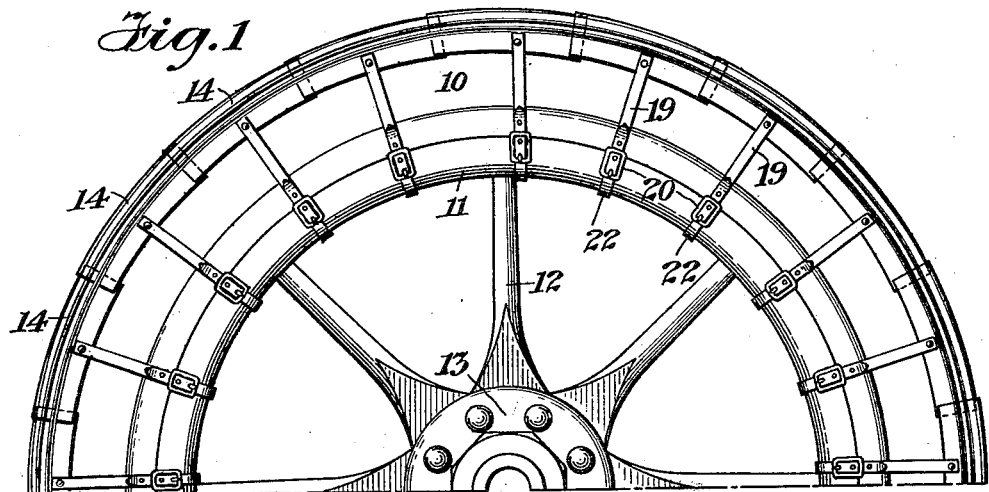
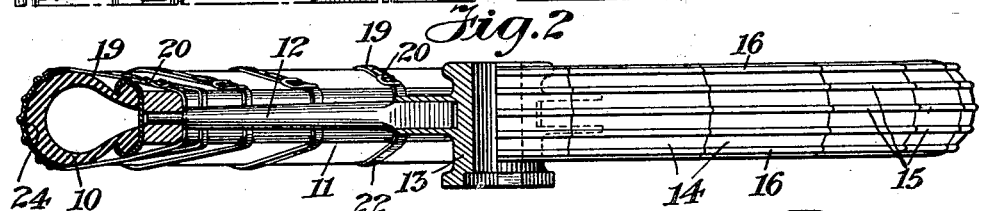
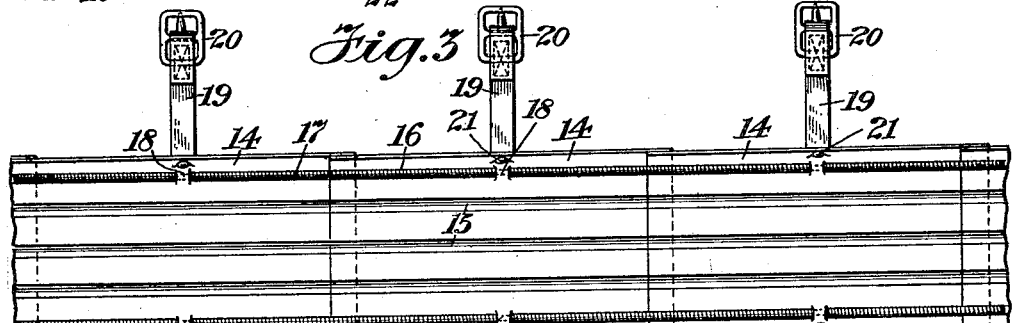
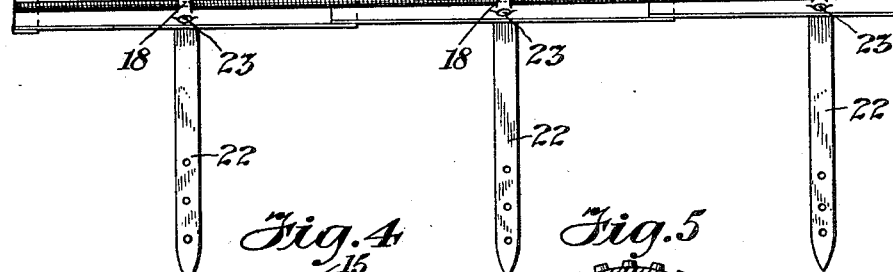

HERMAN SCLAR, OF NEW YORK, N. Y.

ARMOR FOR VEHICLE-TIRES.

1,144,796.  Specification of Letters Patent.  Patented June 29, 1915.

Application filed March 16, 1915. Serial No. 14,651.

*To all whom it may concern:*

Be it known that I, HERMAN SCLAR, a subject of the Czar of Russia, residing in the borough of Brooklyn, in the county of Kings, city and State of New York, have invented an Improvement in Armor for Vehicle-Tires, of which the following is a specification.

My invention relates to that type of armor or protective covering for vehicle tires, which are made with a series of plates adapted to extend over the tread of the tire and to surround the same to prevent the tire from being punctured, and also to prevent the car, on the wheel of which the armor or covering is employed, from skidding.

The particular feature of my invention relates to the manner in which the plates of the armor or covering are constructed and secured together and attached to the tire of a vehicle wheel, as will be hereinafter more particularly described.

In the drawing, Figure 1 is a side elevation of a part of a vehicle wheel fitted with my improved armor or covering. Fig. 2 is an edge view and partial section of the same. Fig. 3 is an inverted plan of a number of sections of the armor on an enlarged scale. Fig. 4 is a diagrammatic section of one form in which each plate of the armor made in accordance with my invention may be constructed, and Fig. 5 is a view similar to Fig. 4, showing a modified form of the invention.

Referring to the drawing, the tire of a vehicle wheel is indicated at 10, a rim of the wheel at 11, the spokes thereof at 12, and its hub at 13.

As hereinbefore stated, my invention relates more particularly to the construction of an armor or covering for a vehicle wheel tire, and in carrying out the same I employ a plurality of similarly shaped plates 14 adapted to fit the tread of a tire, to overlap each other at adjacent ends, and to extend entirely around the tire. As shown particularly in Figs. 2, 3, and 4, each of these plates may be made with a series of longitudinal ribs 15, adapted to assist the armor in gripping the surface of the road and to prevent the car from skidding. I also utilize the extreme outside ribs 16 to receive and contain the springs 17, or other similar devices, by means of which the several plates or sections 14 are secured yieldingly together. As will be understood, in pressing or otherwise forming each plate 14, the external ribs 15 and 16 provide corresponding interior grooves or longitudinal depressions, and I employ the outer longitudinal grooves as receptacles for the springs which yieldingly secure the plates 14 to one another. Approximately, centrally, in each of these outer grooves there is a lug 18, to which the adjacent ends of the springs 17 are secured in any desired manner, in order, as hereinbefore stated, to yieldingly connect the adjacent plates 14 to one another. It will be understood, however, that instead of employing a plurality of springs, I may employ a continuous spring on each side of the armor, so as to extend from end to end of the same, this spring being suitably connected to each plate or section thereof at approximately its central portion. The end plates or sections 14, while not illustrated in the drawing, may be made in half length sections and provided with suitable shoulders or projections, through which tie-bolts may be passed in securing the armor on the tread of the tire. Each section 14 is also preferably provided with a strap member 19, fitted with a buckle 20, the strap 19 being connected to the edge of the section 14 by a rivet 21, or otherwise. I also employ a strap 22 connected to the opposite edge of the section 14 by a rivet 23, or otherwise, and adapted to pass around the rim of the wheel and be engaged in the buckle 20 to further assist in maintaining the armor in position on the tire. Also as shown in Fig. 2, I may employ a layer of felt 24 between the surface of the tire and the armor, in order to prevent undue wear of the tire by direct contact with the inner surface of the armor plates and the springs 17.

It will be readily appreciated that in view of the distance from the center at which the springs 17 are placed, the action of the same will tend to maintain the armor plate in position on the tire independently of the straps 19 and 22, and that, due to these springs 17, the armor plates may move relatively to one another, depending upon the yielding movements of the tire itself.

By reference to Fig. 5, it will be seen that each section or plate 25 of the armor may be provided interiorly with longitudinal grooves 26, adapted to receive the springs

27, which are secured approximately at the central parts thereof in a manner similar to that hereinbefore described, or in any desired way. Also, as shown in Fig. 5, the outer surface of each plate may be provided with suitable projections or knobs arranged in any design to enable the tread of the armor to better grip the surface of the road and to prevent the car from skidding.

I claim as my invention.

1. An armor for vehicle tires comprising a plurality of similarly constructed plates adapted to extend over the tread and around the tire and each provided with interior longitudinal grooves in alinement when the plates are in position on the tire, and means lying normally within the said grooves for yieldingly connecting each plate to adjacent plates at points approximately centrally thereof.

2. An armor for vehicle tires comprising a plurality of similarly constructed plates adapted to extend over the tread and around the tire and provided with interior longitudinal grooves adjacent the edges of the plates and in alinement when the plates are in position, and springs lying in the said grooves and connected to each of the said plates at points approximately centrally thereof.

Signed by me this 2nd day of March 1915.

HERMAN SCLAR. [L. S.]

Witnesses:
GUSSIE ROSENZWEIG,
LEO ROSENZWEIG.

Copies of this patent may be obtained for five cents each, by addressing the "Commissioner of Patents, Washington, D. C."